(No Model.)
E. P. WETMORE.
TROLLEY WIRE AND HANGER.
No. 502,088. Patented July 25, 1893.
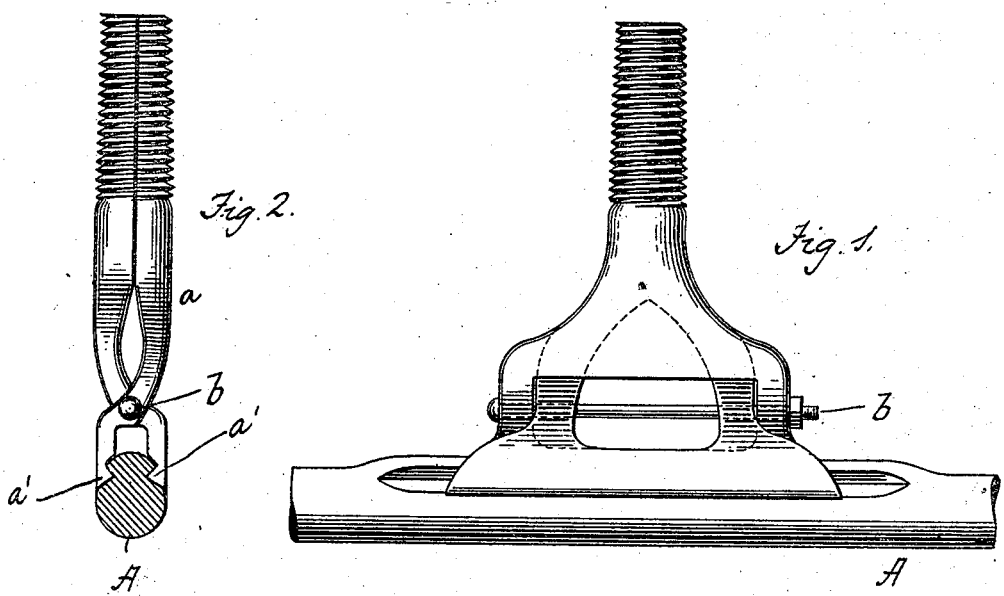
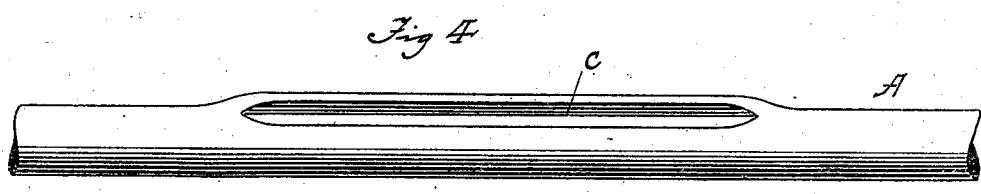
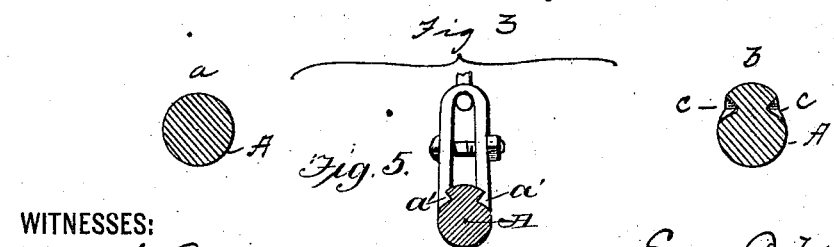
WITNESSES:
Frank S. Ober
Jos. Juhl
INVENTOR
Earl P. Wetmore
BY
M. A. Rosenbaum
ATTORNEY

UNITED STATES PATENT OFFICE.

EARL P. WETMORE, OF HELENA, MONTANA.

TROLLEY WIRE AND HANGER.

SPECIFICATION forming part of Letters Patent No. 502,088, dated July 25, 1893.

Application filed December 23, 1892. Serial No. 456,122. (No model.)

*To all whom it may concern:*

Be it known that I, EARL P. WETMORE, a citizen of the United States, residing at Helena, in the county of Lewis and State of Montana, have invented certain new and useful Improvements in Electric Railways, of which the following is a full, clear, and exact description.

My invention relates to electric railways and has special reference to trolley wire hangers.

The object of the invention is to provide a form of hanger which shall not interfere with the passage of an under contact trolley; which shall be easily attachable to and removable from the wire and which requires no solder or brazing to secure the wire to it.

The invention will be pointed out in the description and claims which follow.

In the accompanying drawings: Figure 1 represents a side elevation of my trolley hanger applied to the wire. Fig. 2 is a transverse section of the same; Fig. 3, *a* and *b*, are two sectional views of the trolley wire. Fig. 4 is a side elevation of the trolley wire prepared for the hanger and Fig. 5 is a modification of the hanger.

The hanger proper is simply a pair of gripping jaws *a* which are supported by a mast arm, cross wire or other usual means. The jaws are elongated where they take hold of the wire and each is provided with a wedge or V-shaped longitudinal internal ridge *a'* forming hooks at the extremities of the jaws. These jaws are formed at the end of a pair of tongs, pivoted together at *b* and having their rear ends threaded and forming a bolt which will screw into the insulator and thereby firmly clamp the jaws upon the wire. If desired, however, the jaws may be formed at the extremities of a U-shaped support, the legs of which will be clamped together by a transverse bolt as shown in Fig. 5.

The trolley wire A, at the point where the hanger is applied, is to be prepared in the following manner: A longitudinal undercut groove *c* about equal in length to the jaws of the hanger, is formed on each side of the wire a slight distance above a horizontal plane passing through the center of the wire. These grooves correspond in shape to the ridges or hooks *a'* formed in the jaws of the hanger. The hanger is applied by saddling it upon the wire and closing the jaws until the ridges *a'* enter the grooves and grip the wire. This forms an interlocking connection of great strength. The hanger may be disconnected and replaced as often as desired without in the least impairing the efficiency of the connection, and as no soldering or brazing is done the connection may be quickly made and broken. The location and depth of the grooves and the thickness of the jaws will preferably be such that the hanger will not project beyond the sides of the wire so that it will not interfere with the passage of the trolley wheel. A preferable way to form the grooves *c* in the wire is with a pair of long handled pinching pliers provided with a seat for the wire and cutting or upsetting jaws which may be pressed into the wire and force the metal outward, as shown in Figs. 3 and 4, without removing any of it. Its total cross-section will not be altered thereby and the resistance of the wire will not be affected. My invention, however, is not confined to any particular method of preparing the wire. If desired, also a series of short grooves or depressions may be formed in the wire in place of the continuous grooves, in which case the jaws of the hanger would be correspondingly formed.

Having described my invention, I claim—

1. The combination of a trolley wire provided at intervals with undercut grooves or depressions, and a pair of jaws fitted into said grooves or depressions, for the purpose set forth.

2. The combination of a trolley wire provided at intervals with undercut grooves or depressions, and a pair of clamping jaws fitted into said grooves or depressions for the purpose set forth.

3. The combination of a trolley wire, provided at intervals with undercut grooves or depressions on two sides horizontally opposite each other and located at or above the center of the wire and a pair of clamping jaws fitting into said grooves or depressions for the purpose set forth.

4. The combination of a trolley wire, provided at intervals with undercut grooves or depressions and a pair of clamping jaws having projections corresponding in shape to the grooves or depressions and adapted to be clamped into the same for the purpose set forth.

In testimony whereof I subscribe my signature in presence of two witnesses.

EARL P. WETMORE.

Witnesses:
H. S. HEPNER,
JOSIAH BOWDEN.